*T. G. Smith Vaniz, Seed Planter.*

117835  PATENTED AUG 8 1871

Witnesses:
H. E. Wattenberg
Rufus Hoyt

Inventor:
T. G. Smith Vaniz
per [signature], Atty

UNITED STATES PATENT OFFICE.

THOMAS G. SMITH VANIZ, OF CANTON, MISSISSIPPI.

IMPROVEMENT IN SEED-PLANTERS.

Specification forming part of Letters Patent No. 117,835, dated August 8, 1871.

*To all whom it may concern:*

Be it known that I, THOMAS G. SMITH VANIZ, of Canton, in the county of Madison and State of Mississippi, have invented a new and Improved Seed-Planter; and I do hereby declare that the following is a full and exact description thereof, reference being had to the accompanying drawing and to the letters of reference marked thereon making a part of this specification.

The nature of this invention is an improvement on the seed-planter heretofore patented to Thomas G. Smith, on the 13th day of April, 1869, and numbered 88,989. The improvement consists mainly in arranging the bearings of the journals of the distributing-wheel so that said wheel may be adjusted at the pleasure of the operator, and by this means enable the distribution of seeds to take place at greater or lesser intervals, or even check such distribution when necessary.

Figure 1:
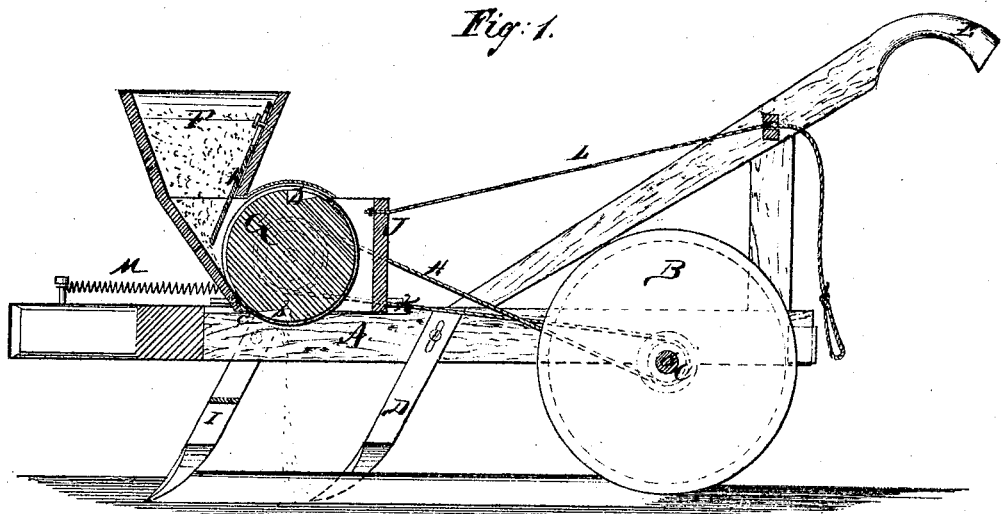
Figure 2:
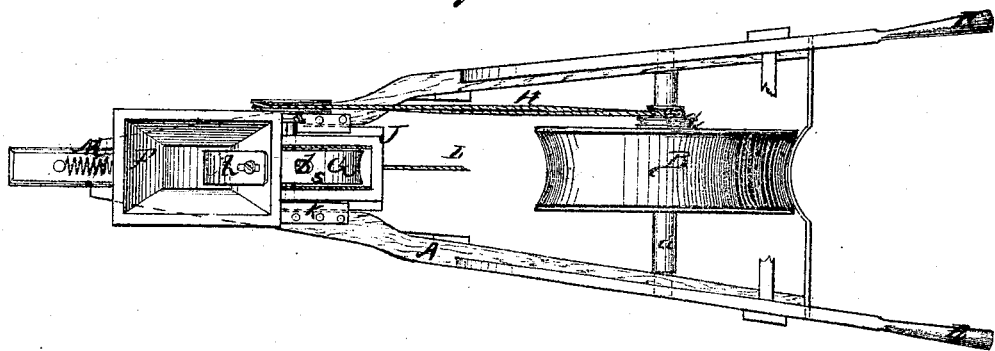

In the accompanying drawing, Figure 1 represents a side view of my invention partly in section. Fig. 2 a plan view.

Similar letters of reference indicate corresponding parts in the several figures.

A represents the frame of the machine; B, the driving-wheel; C, concentric pulley; D, covering-shares; E, guide-handles; F, hopper; G, distributing-wheel; H, belt or cross-band; I, drill-share; $a^x$, axle or shaft; $b$, seed-cells; $c$, discharge-openings.

The several parts indicated by the foregoing letters being the same, or substantially the same, as shown and described in said Letters Patent of April 13, 1869, issued to said Thomas G. Smith, and numbered 88,989, no further description of them or their working need be given here, but reference is made therefore to said patent.

My improvement to the seed-planter described in said patent consists in forming a concave groove or channel, $s$, around the periphery of the distributing-wheel G, so that the same may guide the seeds as they fall from the hopper into the cells $b$, and also in placing said distributing-wheel G within a casing, J, and constructing said casing so that it and the wheel therein may be adjusted. This adjusting is accomplished by providing the lower edge of the casing J, and that portion of the frame A upon which it rests, with a slideway, K, so that the operator, by drawing the cord L, may move or cause the casing J and the wheel therein to move or slide slightly toward him, and thus by slackening the friction of the cross-band H on the pulley C stop the motion of the distributing-wheel G, and thereby check the planting at any point desired without stopping the forward motion of the machine, and also thereby enable said cross-band H to be readily removed from one pulley to the other so as to increase or decrease the speed of said distributing-wheel, and thus enable the seeds to be dropped at greater or lesser intervals at pleasure. To restore and regulate the sliding motion of the casing J, a spiral spring, M, is attached to the forward part of said casing, as shown at Fig. 1. By the action of this spring the friction of the cross-band H on the pulley C is always maintained under all changes of the weather. To keep dust, gravel, or other extraneous matter from interfering with the action of the distributing-wheels, strips of leather $f$ may be attached to the inside, on either side, both of the casing J, at the back part of the periphery of the wheel, or at that part of the wheel against which the grain rests. I also provide the hopper F with a gate, $h$, so that the throat of said hopper may be enlarged or contracted at pleasure, and thus be made to accommodate seed-grains of different sizes and regulate their flow.

Having thus described my invention, what I claim as new, and desire to secure by Letters Patent, is,—

1. The distributing-wheel G, having a channeled or grooved periphery and made adjustable, substantially as described.

2. The combination of the hopper F and adjustable casing J with the spiral spring M and leather linings $f$.

3. A seed-planter composed essentially of the hopper F $h$, distributing-wheel G $s$, adjustable casing J, the spring M, and cord L, or their equivalents, and a frame, A, with drill and covering-shares, a wheel, B, and driving-gearing, all operating substantially as herein described.

THOS. G. SMITH VANIZ.

Witnesses:
S. L. MOSBY,
W. T. WRIGHT.